(12) United States Patent
Kolagotla et al.

(10) Patent No.: US 6,182,105 B1
(45) Date of Patent: Jan. 30, 2001

(54) MULTIPLE-OPERAND ADDITION WITH INTERMEDIATE SATURATION

(75) Inventors: Ravi Kumar Kolagotla, Lansdale; Hosahalli R. Srinivas, Allentown, both of PA (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/140,959

(22) Filed: Aug. 27, 1998

(51) Int. Cl.$^7$ .................................................. G06F 7/50
(52) U.S. Cl. ............................................................. 708/552
(58) Field of Search .................................... 708/552, 498, 708/530

(56) References Cited

U.S. PATENT DOCUMENTS

| | | | | |
|---|---|---|---|---|
| 5,889,689 | * | 3/1999 | Alidina | 708/530 |
| 5,936,870 | * | 8/1999 | Im | 708/552 |
| 5,974,540 | * | 10/1999 | Morikawa et al. | 708/552 |
| 6,012,077 | * | 1/2000 | Tai | 708/552 |

* cited by examiner

Primary Examiner—David H. Malzahn
(74) Attorney, Agent, or Firm—Darby & Darby

(57) ABSTRACT

A first adder-subtracter combines the first input with the largest positive number capable of being represented by the number of bits in the datapath. A second adder-subtracter operating in parallel with the first adder-subtracter combines the first input with the largest negative number capable of being represented by the number of bits in the datapath. A third adder-subtracter combines the first, second, and third inputs and operates in parallel with the first and second adder-subtracters. A carry/sign detector circuit operating in parallel with all three adder-subtracters determines the sign and the carry of the sum of the second and third inputs. A MUX select logic circuit operates on the carry and the signs of the potential sums of all the adder-subtracters and the carry/sign detector and generates select signals for a multiple-input MUX which selects one of the potential sums or the largest positive or largest negative numbers as the final sum output of the multiple-input adder-subtracter with intermediate saturation.

24 Claims, 3 Drawing Sheets

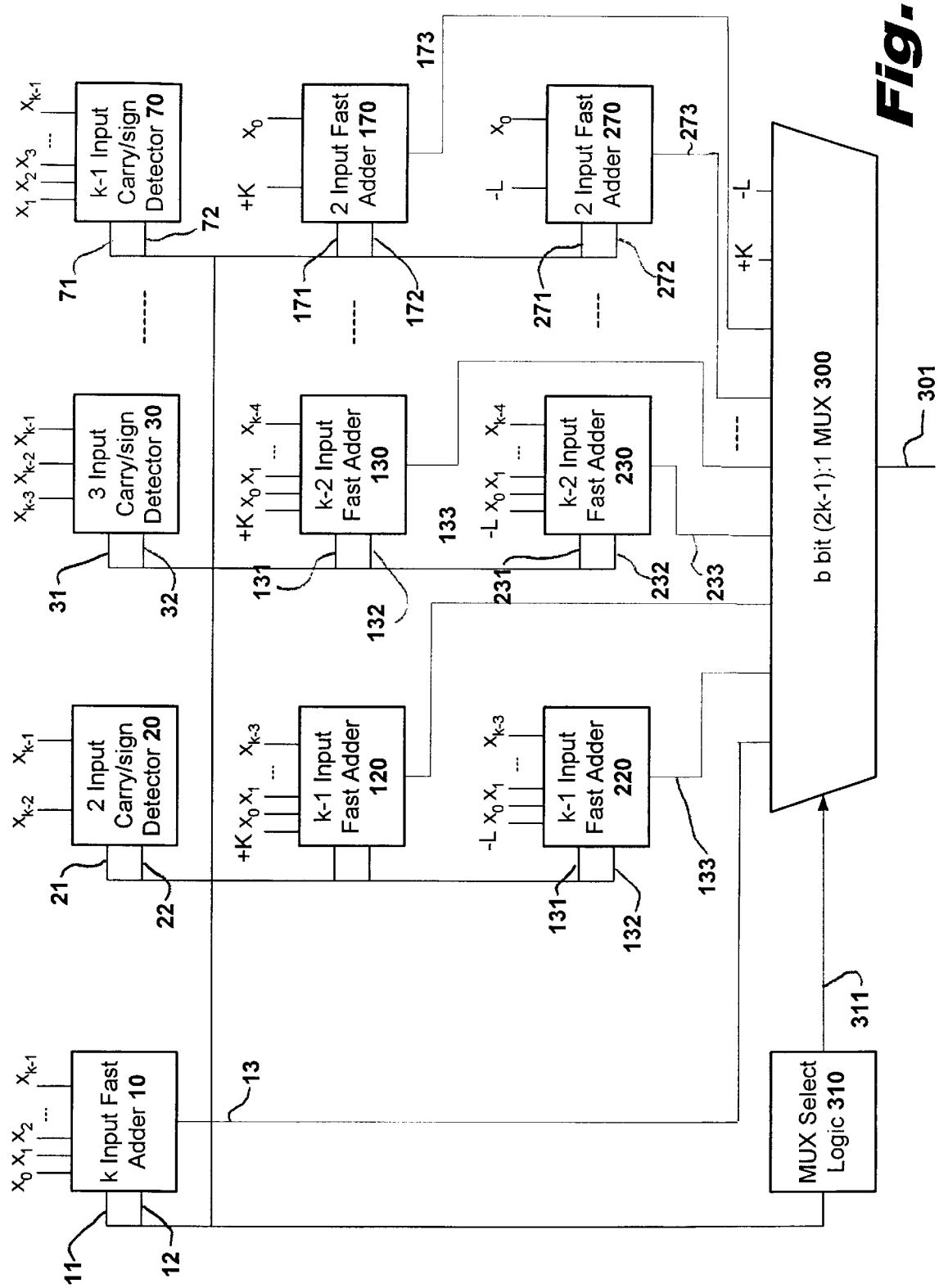

MULTIPLE-OPERAND ADDITION WITH INTERMEDIATE SATURATION

FIELD OF THE INVENTION

The present invention relates to circuitry that can be used to speed up addition of multiple operands with saturation of intermediate results.

BACKGROUND OF THE INVENTION

A digital signal processor (DSP) is a special-purpose CPU utilized for digital processing and analysis of signals from analogue sources, such as sound. The analog signals are converted into digital data and analyzed using various algorithms, such as Fast Fourier Transforms. DSPs are designed for particularly fast performance of certain operations, such as multiplication, multiplying the accumulating, and shifting and accumulating, because the math-intensive processing applications for DSPs rely heavily on such operations. For this reason, a DSP will typically include special hardware circuits to perform multiplication, accumulation and shifting operations.

One popular form of DSP architecture is known as a Multiply-Accumulate or MAC processor. The MAC processor implements an architecture that takes advantage of the fact that the most common data processing operations involve multiplying two values, then adding the resulting value to another and accumulating the result. These basic operations are efficiently carried out utilizing specially configured, high-speed multipliers and accumulators, hence the "Multiply-Accumulate" nomenclature. In order to increase the processing power of MAC processors, they have been designed to perform different processes concurrently. Towards this end, DSP architectures with plural MAC structures have been developed. For example, a dual MAC processor is capable of performing two independent MAC operations concurrently.

An addition operation in a processor, such as a digital signal processor, involves either adding or subtracting two or more numbers. These numbers may be represented in radix-2 (binary), radix-4, or any other radix. Subsequent to or in parallel with the addition operation, the result of the addition operation (here referred to as a sum) is evaluated to determine whether an overflow has occurred. If an overflow has occurred, the sum is saturated. Saturating means setting to the largest quantity, positive or negative, capable of being represented by the processor. If an overflow occurs in a negative sense, the sum is set to the largest negative number. If an overflow occurs in a positive sense, the sum is set to the largest positive number.

Bit exact standards have been written for processor architectures that contain a single Multiply-Accumulate (MAC) unit. Such single MAC processors, typically have one two-input adder, and saturate a sum following each addition operation. Multiple operands can be added in a sequential fashion in such single MAC processor.

Faster addition can be accomplished in processors containing multiple (more than one) MAC units by simultaneously adding together multiple operands in a multiple-input adder. However, the resulting sum generated on a multiple MAC processor can be different than the sum generated on a single MAC processor. The difference results from the fact that the intermediate sums are saturated during sequential addition on a single MAC processor. Bit exact standards that have been developed for single MAC processors cannot exploit the multiple-input adders in a multiple MAC processor unless a technique is developed that can be used to add together multiple operands on multiple MAC processors while saturating intermediate results.

One way to accomplish this is disclosed in U.S. patent application Ser. No. 08/927,558, filed Sep. 8, 1997 now U.S. Pat. No. 5,889,689, and entitled "Hierarchal Carry Select, Three-Input Saturation", the disclosure of which is hereby incorporated by reference. This technique works for three-operand addition with intermediate saturation, but cannot easily be extended to multiple-operand addition. This technique introduces additional delay into the critical path of the circuit.

SUMMARY OF THE INVENTION

In accordance with the present invention, a first adder-subtracter combines the first input with the largest positive number capable of being represented by the number of bits in the datapath. A second adder-subtracter, operating in parallel with the first adder-subtracter, combines the first input with the largest negative number capable of being represented by the number of bits in the datapath. A third adder-subtracter combines the first, second and third inputs and operates in parallel with the first and second adder-subtracters. A carry/sign detector circuit operating in parallel with all three adder-subtracters determines the sign and the carry of the sum of the second and third inputs. A multiplexer (MUX) select logic circuit operates on the carry and the signs of the potential sums of all the adder-subtracters and the carry/sign detector and generates select signals for a multiple-input MUX which selects one of the potential sums or the largest positive or largest negative numbers as the final sum output of the multiple-input adder-subtracter with intermediate saturation.

BRIEF DESCRIPTION OF THE DRAWINGS

The foregoing brief description, as well as various objects, features and advantages of the present invention will be understood more completely from the following detailed description of a presently preferred embodiment, with reference being had to the accompanying drawings, in which:

FIG. 3 is a schematic diagram of a multiple-operand adder/subtracter with intermediate saturation in accordance with the present invention.

DETAILED DESCRIPTION

In the following discussion the term "adder" is used to denote either an adder, a subtracter or an adder/subtrater that either adds or subtracts under program control.

Figure 1:
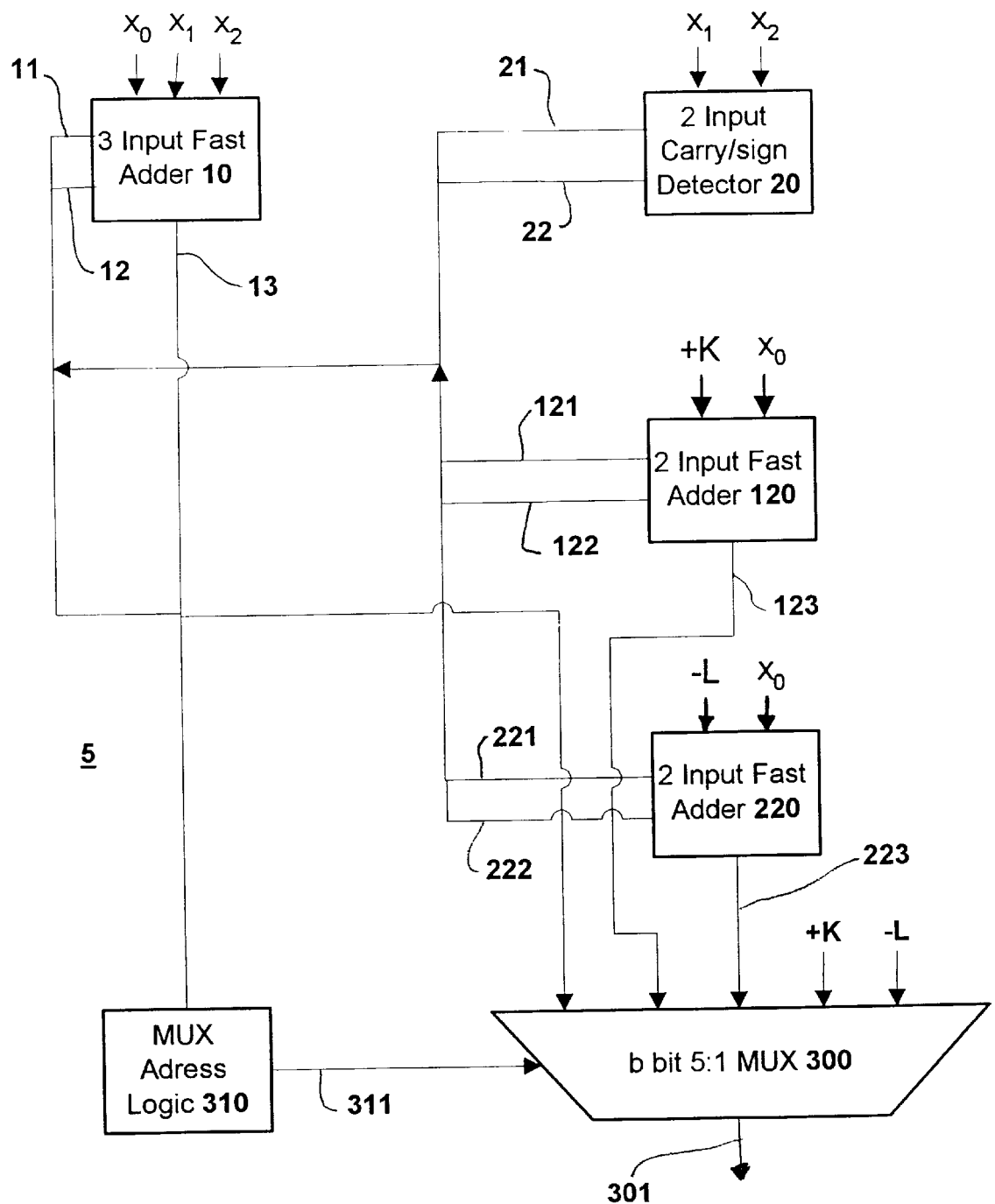
FIG. 1 is a schematic diagram of a three-operand adder/subtracter with intermediate saturation in accordance with the present invention.

A three-operand adder 5 with intermediate saturation, in accordance with the present invention, is shown in FIG. 1. A three-input adder 10 adds the three inputs $x_0$, $x_1$ and $x_2$ to generate a first potential result 13. Adder 10 generates signal 11 to indicate the presence or absence of an overflow in potential result 13. Adder 10 also generates signal 12 to indicate the sign of potential result 13.

Auxiliary adder 120 is used to add one of the inputs, $x_0$, with the positive saturation constant, +K, and auxiliary adder 220 is used to add the same input, $x_0$, with the negative saturation constant, −L. In a 32-bit machine, the positive saturation constant, +K, is 0x7FFFFFFF and the negative saturation constant, −L, is 0x80000000. Since these constants are fixed, the auxiliary adders 120 and 220 do not have to be general purpose adders. The circuitry of adders 120 and 220 can be simplified. For example, adder 220 need only invert the most significant bit of input $x_0$. in order to generate the potential result 223.

Adder 120 also generates signal 121 to indicate the presence or absence of an overflow in potential result 123 and signal 122 to indicate the sign of potential result 123. Similarly, adder 220 also generates signal 221 to indicate the presence or absence of an overflow in potential result 223 and signal 222 to indicate the sign of potential result 223.

The three potential results 13, 123, and 223 are routed as three of the five inputs to a 5:1 input multiplexer 300. The other two inputs of multiplexer 300 are the positive saturation constant, +K, and the negative saturation constant, −L. Multiplexer 300 selects one of its inputs as the final result 301 based on control signals 311 from the MUX select logic unit 310.

A carry/sign detector 20 takes inputs $x_1$ and $x_2$, and generates signal 21 to indicate the presence or absence of an overflow in the sum of these two inputs, as well as signal 22 to indicate the sign of this result. Carry/sign detector 20 need not generate the sum of the two inputs in order to generate the two signals 21 and 22.

Figure 2:
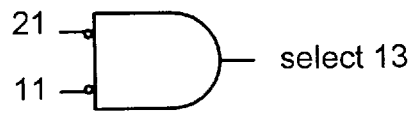
FIG. 2 is a logic diagram describing the MUX control logic for a three-operand adder/subtracter with intermediate saturation.
Figure 2:
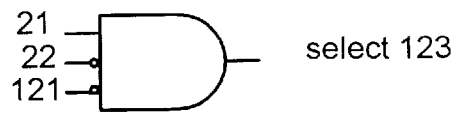
Figure 2:
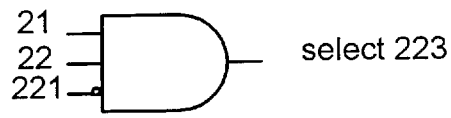
Figure 2:
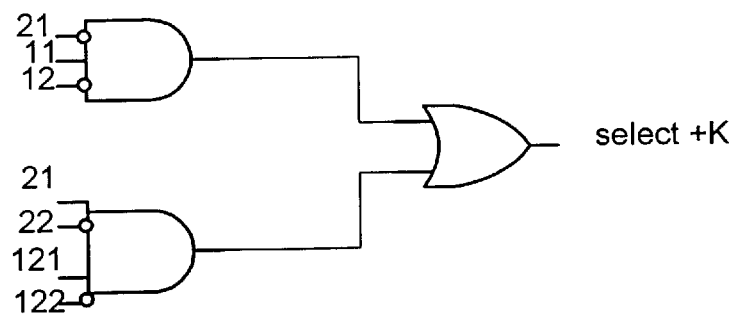
Figure 2:
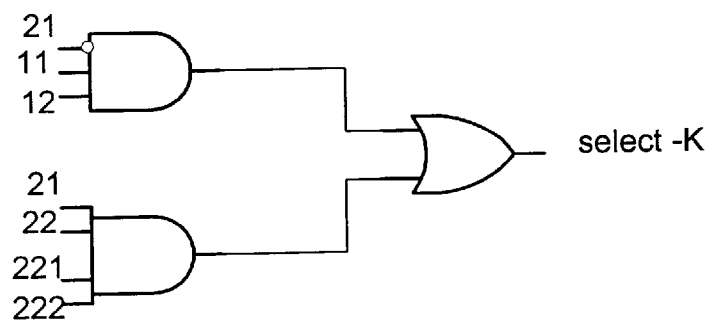

The overflow signals 11, 21, 121 and 221, as well as the sign signals 12, 22, 122, and 222, are routed to MUX select logic unit 310, which generates control signals 311 for multiplexer 300. FIG. 2 shows a preferred implementation of the MUX select logic unit 310. In FIG. 2, we assume that signals 11, 21, 121 and 221 indicate the presence of an overflow if they are in a logic high state and the absence of an overflow if they are in a logic low state. We also assume that signals 12, 22, 122 and 222 indicate a negative sign if they are a logic high, and a positive sign if they are a logic low. The invention is not limited to these assumptions, however. They are made for the purposes of illustration of the logic performed in the MUX select logic unit 310.

Potential result 13 is selected as the output, if signal 21 is low and signal 11 is low. Potential result 123 is selected as the output if signal 21 is high, signal 22 is low, and signal 121 is low. Potential result 223 is selected as the output if signal 21 is high, signal 22 is high, and signal 221 is low. The positive saturation constant is selected as the output if signal 21 is low, signal 11 is high, and signal 12 is low. The positive saturation constant is also selected as the output if signal 21 is high, signal 22 is low, signal 121 is high, and signal 122 is low. The negative saturation constant is selected as the output if signal 21 is low, signal 11 is high, and signal 12 is high. The negative saturation constant is also selected as the output if signal 21 is high, signal 22 is high, signal 221 is high and signal 222 is high.

FIG. 3 shows a k-operand adder 6, with intermediate saturation, in accordance with the present invention. The k input adder 10 adds all k input operands and generates a potential result 13 which is routed as an input to multiplexer 300. It also generates signal 11 to indicate the presence or absence of an overflow in potential result 13 and signal 12 to indicate the sign of result 13. Auxiliary adder 120 adds the positive saturation constant, +K, with the first k-2 inputs to generate a potential result 123, as well as overflow signal 121 and sign signal 122. Similarly, a plurality auxiliary adders 130 through 170 add the positive saturation constant with the first k-3 through the first input to generate potential results 133 through 173, as well as overflow signals 131 through 171 and sign signals 132 through 172. The potential results 123 through 173 are also routed as inputs to multiplexer 300. Auxiliary adder 220 adds the negative saturation constant, −L, with the same k-2 inputs to generate a potential result 223, as well as overflow signal 221 and sign signal 222. Similarly, a plurality auxiliary adders 230 through 270 add the positive saturation constant with the first k-3 through the first input to generate potential results 233 through 273, as well as overflow signals 231 through 271 and sign signals 232 through 272. The potential results 223 through 273 are also routed as inputs to multiplexer 300. The positive and negative saturation constants are also routed as inputs to multiplexer 300.

A plurality of carry sign detectors 20 through 70 are used to generate overflow signals 21 through 71 and sign signals 22 through 72, based on the addition of the last two, through the last k-1 inputs, respectively. These detectors need not actually generate the sum of their inputs. All overflow signals 11, 21 through 71, 121 through 171, and 221 through 271 are routed to MUX select logic unit 310. All sign signals 12, 22 through 72, 122 through 172, and 222 through 272 are also routed to MUX select logic unit 310. The MUX select logic unit 310 generates select signals 311 which are used by the multiplexer 300 to select one of its input signals as output 301, which is the result of the multiple-input addition with intermediate saturation.

In practice, adders 120 through 170 do not have to be built as separate units. A typical multiple-input adder consists of an array of carry-save adders followed by a fast carry-propagate adder. The carry-save adders can be shared among adders 120 through 170. Similarly, the carry-save adders can be shared among adders 220 through 270.

While the illustrative embodiment has not been described as containing any power saving circuitry, one skilled in the art would recognize the power saving that can be achieved by shutting off, or gating off, adders that are unnecessary for the specific inputs being processed. For example, if all inputs are positive, and they are being added together, power savings can be achieved by shutting off all the adders that combine inputs with the largest negative quantity.

While the illustrative embodiment has not been described as incorporating pipelining, one skilled in the art would recognize the enhanced computational efficiency available by utilizing pipelining in the design. Pipelining is achieved by initiating computation with a new data set before completing computations with a previous data set. The more latches used in pipelining, the greater the depth of pipelining. Pipelining causes an initial latency in computation time required to fill the pipelining, but maximizes the throughput (the rate of completion) of the operation.

We claim:

1. A method for adding and/or subtracting three input quantities with intermediate saturation, comprising the steps of:

generating a first potential result that is a combination of the first of the quantities to be added/subtracted and the largest positive quantity capable of being represented for a given number of bits;

simultaneous with generating the first potential result, generating a second potential result that is a combination of the first of the quantities to be added/subtracted and the largest negative quantity capable of being represented for a given number of bits;

also simultaneously with generating the first and the second potential results, generating a third potential result that is a combination of all three quantities; and selecting one of the first, second, or third potential results, or the largest positive or the largest negative quantities as the selected result of the operation.

2. The method of adding and/or subtracting three input quantities, as recited in claim 1, wherein generating the first potential result further comprises:
   detecting the presence of absence of an overflow in the first potential result.

3. The method of adding and/or subtracting three input quantities, as recited in claim 1, wherein generating the second potential result further comprises:
   detecting the presence of absence of an overflow in the second potential result.

4. The method of adding and/or subtracting three input quantities, as recited in claim 1, wherein generating the third potential result further comprises:
   detecting the presence of absence of an overflow in the third potential result.

5. The method of adding and/or subtracting three input quantities, as recited in claim 1, wherein the selecting step comprises:
   detecting the sign of the result of the combination of the second and third input quantities; and
   detecting the presence or absence of an overflow as a result of the combination of the second and the third input quantities.

6. The method of adding and/or subtracting three input quantities, as recited in claim 1, wherein the selecting step further comprises:
   selecting the first potential result as the selected result if it does not overflow, and if the combination of the second and third quantities overflows, and is positive.

7. The method of adding an/or subtracting three input quantities, as recited in claim 1, wherein the selecting step further comprises:
   selecting the second potential result as the selected result if it does not overflow, and if the combination of the second and third quantities overflows, and is negative.

8. The method of adding and/or subtracting three input quantities, as recited in claim 1, wherein the selecting step further comprises:
   selecting the third potential result as the selected result if it does not overflow, and if the combination of the second and third quantities does not overflow.

9. The method of adding and/or subtracting three input quantities, as recited in claim 1, wherein the selecting step further comprises selecting the largest positive quantity as the selected result if:
   the combination of the second and third quantities does not overflow and the combination of the first, the second, and the third quantities overflows, and is positive; or if
   the combination of the second and third quantities overflows and is positive, and the first quantity is positive.

10. The method of adding and/or subtracting three input quantities, as recited in claim 1, wherein the selecting step further comprises selecting the largest negative quantity as the selected result if:
    the combination of the second and third quantities does not overflow and the combination of the first, the second and the third quantities overflows, and is negative; or if
    the combination of the second and third quantities overflows and is negative, and the first quantity is negative.

11. A circuit for adding and/or subtracting three input quantities with intermediate saturation, comprising:
    a first adder/subtracter connected to add and/or subtract the first quantity to the largest positive quantity capable of being represented in a given number of bits to generate a first potential result;
    a second adder/subtracter connected to add and/or subtract the first quantity to the largest negative quantity capable of being represented in a given number of bits to generate a second potential result;
    a third adder/subtracter connected to add and/or subtract all three input quantities and generate a third potential result;
    a multiplexer connected to receive as a first input the first potential result, as a second input the second potential result, as a third input the third potential result, as a fourth input the largest positive quantity, and as a fifth input the largest negative quantity; and
    MUX select logic to cause the multiplexer to select one of its inputs as the selected result.

12. A circuit as recited in claim 11, further comprising:
    circuitry detecting the presence or absence of an overflow in the first potential result.

13. A circuit as recited in claim 11, further comprising:
    circuitry detecting the presence or absence of an overflow in the second potential result.

14. A circuit as recited in claim 11, further comprising:
    circuitry detecting the presence or absence of an overflow in the third potential result.

15. A circuit as recited in claim 11, wherein the MUX select logic comprises:
    circuitry detecting the sign of the result of combining the second and third input quantities; and
    circuitry detecting the presence or absence of an overflow in the result of the combining the second and the third input quantities.

16. A circuit as recited in claim 11, wherein the MUX select logic further comprises:
    circuitry selecting the first potential result as the selected result if it does not overflow, and if the result of the combination of the second and third quantities overflows, and is positive.

17. A circuit as recited in claim 11, wherein the MUX select logic further comprises:
    circuitry selecting the second potential result as the selected result if it does not overflow, and if the result of the combination of the second and third quantities overflows, and is negative.

18. A circuit as recited in claim 11, wherein the MUX select logic further comprises:
    circuitry selecting the third potential result as the selected result if it does not overflow, and if the combination of the second and the third quantities does not overflow.

19. A circuit as recited in claim 11, wherein the MUX select logic further comprises circuitry selecting the largest positive quantity as the selected result if:
    the combination of the second and the third quantities does not overflow, and the third potential result overflows and is positive; or if
    the combination of the second and third quantities overflows and is positive, and the first quantity is positive.

20. A circuit as recited in claim 11, wherein the MUX select logic further comprises circuitry selecting the largest negative quantity as the selected result if:
    the combination of the second and the third quantities does not overflow, and the third potential result overflows and is negative; or if
    the combination of the second and third quantities overflows and is negative, and the first quantity is negative.

21. A circuit as recited in claim 11, wherein the circuit is an integrated circuit.

22. A circuit as recited in claim 21, wherein the integrated circuit comprises a digital signal processor.

23. A circuit for adding and/or subtracting with intermediate saturation k input quantities $x_0, x_1, x_2 \ldots x_{k-1}$, comprising:

a first set of k-2 adder/subtracters, the nth of which is connected to add to and/or subtract from the largest positive quantity capable of being represented in a given number of bits the quantities $X_0$ through $X_{n-1}$, to generate a respective first potential result for each respective first set adder/subtracter;

a second set of k-2 adders/subtracters, the nth of which is connected to add to and/or subtract from the largest negative quantity capable of being represented in a given number the quantities $x_1$ through $X_{n-1}$, to generate a respective second potential result for each respective second set adder/subtracter;

a third adder/subtracter connected to add to and/or subtract all k input quantities, to generate a third potential result;

a multiplexer to receiving as inputs the first potential result from each of said first set adder/subtracters, the second potential result from each of said second set adder/subtracters, the third potential result, the largest positive quantity, and the largest negative input; and MUX select logic to cause the multiplexer to select one of its inputs as the selected result.

24. A method for adding and/or subtracting with intermediate saturation k input quantities $x_0, x_1, x_2 \ldots x_{k-1}$ in a processor, comprising the steps of:

generating a first set of potential results made of up k-2 combinations, in which the nth combination combines the largest positive quantity capable of being represented in a given number of bits with the quantities $X_0$ through $X_{n-1}$;

simultaneously generating a second set of potential results made up of k-2 combinations, in which the nth combination combines the largest negative quantity capable of being represented in a given number of bits with the quantities $X_0$ through $X_{n-1}$;

simultaneously generating a third potential result which is a combination of all k input quantities; and selecting as the result of the method one of: said first set of potential results; said second set of potential results and said third potential result.

* * * * *